(12) United States Patent
Shih

(10) Patent No.: US 6,519,035 B1
(45) Date of Patent: Feb. 11, 2003

(54) EFFICIENT AUTO-ALIGNMENT METHOD FOR CYLINDRICAL LASER OPTICAL RESONATORS

(75) Inventor: Chun-Ching Shih, Palos Verdes Estates, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/513,947

(22) Filed: Feb. 28, 2000

(51) Int. Cl.[7] .............................................. G01B 11/02
(52) U.S. Cl. ..................................... 356/399; 356/510
(58) Field of Search .................................. 356/508, 510, 356/520; 372/94

(56) References Cited

U.S. PATENT DOCUMENTS 6,282,225 B1 * 8/2001 Bullock et al. ............... 372/94

* cited by examiner

Primary Examiner—Samuel A. Turner
Assistant Examiner—Patrick Connolly

(57) ABSTRACT

A method for aligning the optical surfaces of a high extraction annular ring resonator which includes a scraper mirror with a decentered aperture. A probe beam is directed into the resonator cavity through the decentered aperture in the scraper mirror, and a visual and quantitative assessment of the amount of compact leg tilt and rear cone decentration is made. The optical surfaces are then repositioned into alignment based upon the results of the assessment.

6 Claims, 2 Drawing Sheets

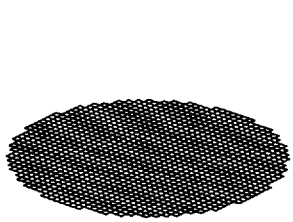
Phase - Aligned Case
FIG. 3a

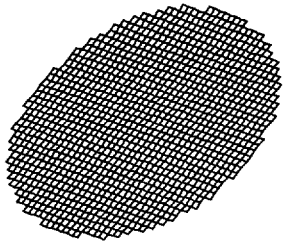
CLT-induced Phase Tilt
FIG. 3b

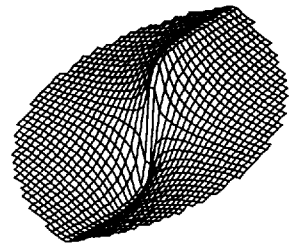
RCD-induced Phase Shearing
FIG. 3c

Tilts in Full Circle

$$T_x^{full} = t_x^{CLT} + t_x^{RCD}$$

$$T_y^{full} = t_y^{CLT} + t_y^{RCD}$$

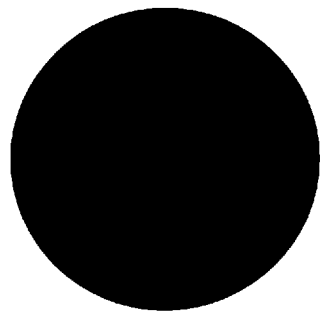

Alignment Conditions

$$t_x^{CLT} = 2T_x^{full} - T_x^{half}$$

$$t_y^{CLT} = 2T_y^{full} - T_y^{half}$$

$$t_x^{RCD} = T_x^{half} - T_x^{full}$$

$$t_y^{RCD} = T_y^{half} - T_y^{full}$$

Tilts in Half Circle

$$T_x^{half} = t_x^{CLT} + 2t_x^{RCD}$$

$$T_y^{half} = t_y^{CLT} + 2t_y^{RCD}$$

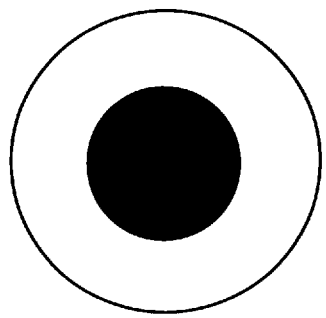

FIG. 4

EFFICIENT AUTO-ALIGNMENT METHOD FOR CYLINDRICAL LASER OPTICAL RESONATORS

CROSS-REFERENCE TO RELATED APPLICATIONS

This application is related to a patent application entitled "Method for Aligning a Cylindrical Laser Optical Resonator" by D. Bullock et al., Ser. No. 09/231,918, filed Jan. 14, 1999, assigned to the same assignee as the present application and incorporated hereinto by reference.

BACKGROUND OF THE INVENTION

1. Field of the Invention

The present invention relates to a method for aligning a cylindrical laser optical resonator and more particularly to a method for aligning a high extraction decentered annular ring resonator (HEXDARR).

2. Description of the Prior Art

Various types of lasers are known in the art. For example, chemical lasers are known. Examples of such chemical lasers are disclosed in U.S. Pat. Nos. 3,575,669; 3,992,685; 4,237,429; 4,514,698; 5,099,492; and 5,624,564, hereby incorporated by reference. In order to provide relatively high power lasers in a relatively compact configuration, lasers utilizing a cylindrical gain generator and an annular ring resonator have been developed. In such lasers, the cylindrical gain generator is disposed within an annular ring resonator. In such a configuration, the gain medium flows radially outwardly from the cylindrical gain generator into an annular gain volume of the cylindrical resonator. In order to extract the maximum amount of power from the annular gain volume, high extraction annular ring resonators have been developed, for example, as disclosed in U.S. Pat. Nos. 4,598,408 and 4,744,090, and in the aforementioned pending '918 patent application, assigned to the same assignee as the present invention hereby incorporated by reference. Examples of other annular ring resonators are also disclosed in U.S. Pat. Nos. 4,606,036 and 4,516,214. The annular ring resonators, for example, as disclosed in the '408 patent, include a conical rear reflector, a waxicon, a reflaxicon, a scraper mirror with a decentered aperture and a plurality of flat beam steering mirrors forming a compact leg of the resonator. The decentered aperture in the scraper mirror allows a circular beam of light to be transmitted therethrough and reflected in the compact leg of the waxicon. The waxicon expands the circular beam into an annular light beam which makes a first pass through the annular gain volume. The annular beam is reflected by the conical rear reflector and thus makes a second pass through the annular gain volume. The annular beam reflected from the rear reflector is reflected to the reflaxicon, where the beam is compacted and a portion thereof reflected through the decentered aperture of the scraper mirror as feedback with the balance of the beam outcoupled as an output beam.

While such annular ring resonators provide relatively high gain, such resonators are not without disadvantages. For example, the optical elements behave quite differently from the ordinary optics used for conventional laser resonator designs. In general, tilt or decentration of these conical mirrors will result in a combination of phase tilt and other high-order phase aberrations in the output beam. Therefore, the resonator alignment becomes more complicated when the characteristics of the output beam are used to monitor the misalignment status of the resonator. Several alignment techniques have been developed for HEXDARR in the past few years. Earlier techniques were based on minimizing the observed near-field wave front error (WFE). Recently, an alignment method based on far-field patterns has been proposed (previously referenced Ser. No. 09/231,918) and used in high-energy laser tests. However these techniques do not provide a definite answer to the misalignment status of the resonator. In general, they are iterative procedures involving trials and errors. Furthermore, most techniques need human interface for pattern recognition and human's judgement for adjusting the optics. These techniques may be working satisfactorially for the current ground tests; however, for a space-based laser system, an auto-alignment technique with a quick and accurate assessment of the misalignment status is very important.

SUMMARY OF THE INVENTION

It is an object of the present invention to solve various problems in the prior art.

It is yet another object of the present invention to provide a simplified method for aligning the optical surfaces within a cylindrical ring resonator.

Briefly, the present invention relates to a method for aligning the optical surfaces of the high extraction annular ring resonator which includes a scraper mirror with a decentered aperture. A probe beam from an external laser is directed into the resonator cavity through the decentered aperture in the scraper mirror. A visual and quantitative assessment of the amount of compact leg tilt and rear cone decentration is made, and the optical surfaces of the resonator are then repositioned into alignment based upon the results of the assessment.

BRIEF DESCRIPTION OF THE DRAWINGS

These and other objects of the present invention will be more fully understood with reference to the following specification and attached drawing wherein:

FIG. 3 is a graphic illustration showing the major effects of compact leg tilt and rear cone decentration on the output phase; and FIG. 4 is a graphic illustration showing how the tilts can be evaluated with either a half circle or full circle to derive the tilts associated with the compact leg tilt and the rear cone decentration.

DETAILED DESCRIPTION OF THE PREFERRED EMBODIMENT

The present invention relates to a method for systematically aligning a cylindrical resonator, such as a high extraction decentered annular ring resonator (HEXDARR) to produce an output mode phase distribution quality not heretofore achieved consistently. In particular, the alignment method in accordance with the present invention is based on observations of certain key types of misalignment, indicated by the appearance of certain features in the phase profile of the alignment probe beam after it passes one round trip through the resonator. In addition, the probe beam if it is suitably masked upon exiting the aligned resonator can be made to have certain reflection symmetry properties which become important for determining the quality of the alignment.

Figure 1:
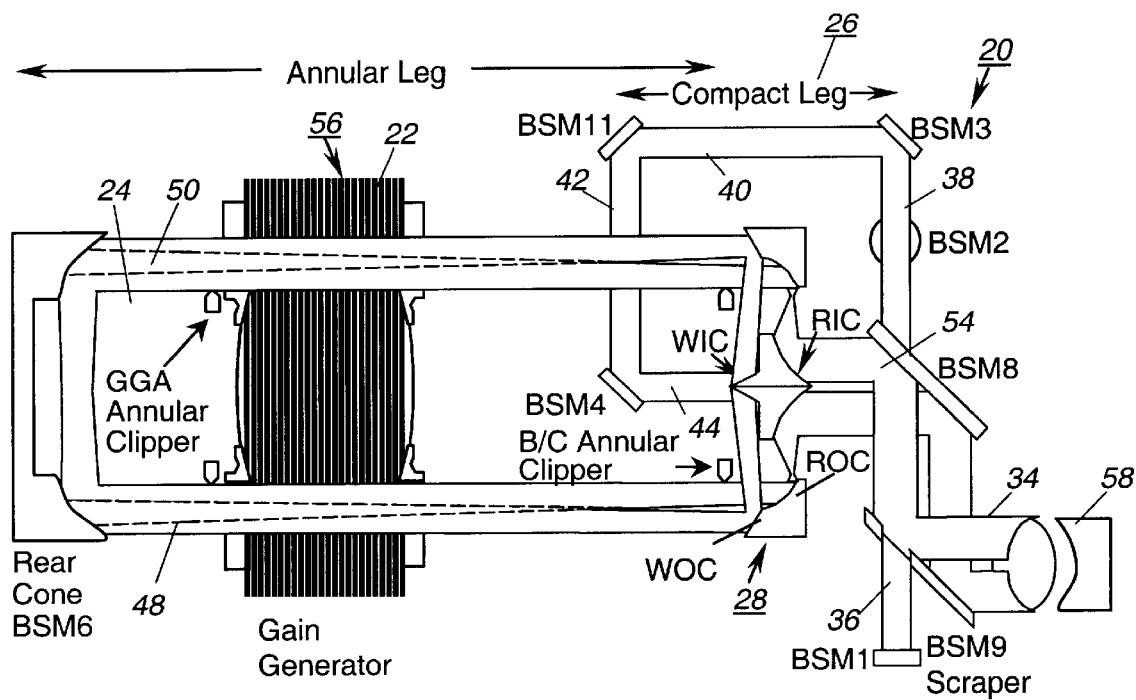
FIG. 1 is an elevational view of a high extraction annular ring resonator, shown with the housing removed.
Figure 2:
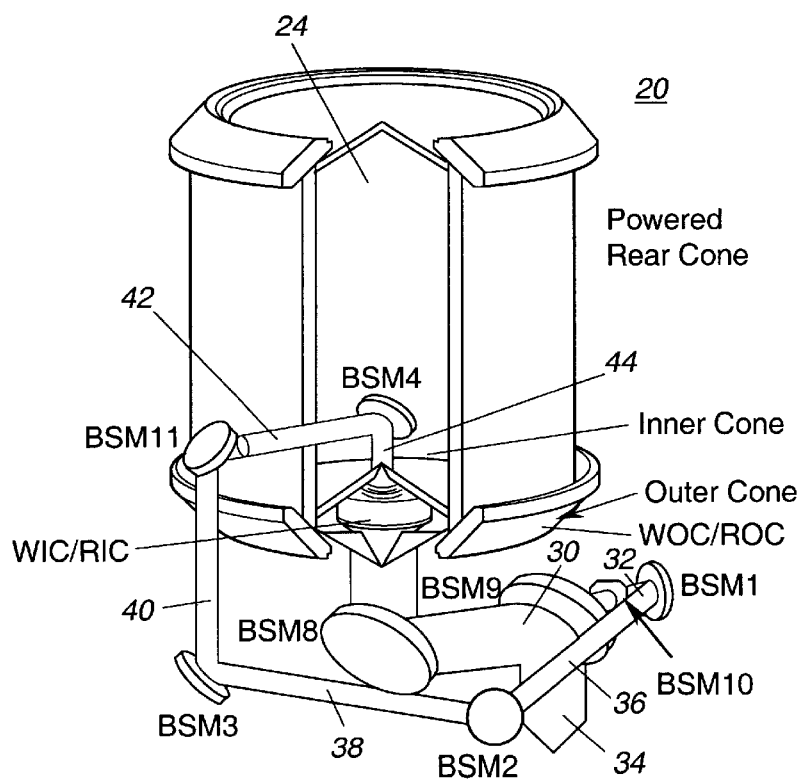
FIG. 2 is a simplified perspective view of the high extraction annular ring resonator illustrated in FIG. 1, shown with the housing and gain generator removed.

A high extraction decentered aperture ring resonator (HEXDARR) is illustrated in FIGS. 1 and 2 and generally identified with the reference numeral 20. The resonator 20 is adapted to be used with a high power continuous wave chemical lasers which include a cylindrical gain generator 22. As illustrated in FIG. 1, the gain generator 22 may be eccentrically disposed within the generally cylindrical resonator 20. The gain medium from the gain generator 22 flows radially outward from the gain generator 22 and into an annular gain volume 24, the inner radius of which is defined by the exterior radius of the cylindrical gain generator 22 and the outer radius of which is defined by a downstream boundary where the flowing gain medium becomes absorbing. As will be discussed in more detail below, the high power gain of the laser is accomplished by a folded mode path through the annular gain volume 24. A compact leg, generally identified with the reference numeral 26, is used to provide feedback of the laser power to the annular gain volume 24 of the resonator. The compact leg 26 includes a plurality of flat beam steering mirrors BSM1, BSM2, BSM3, BSM11 and BSM4. The system also includes a rear cone mirror BSM6. As will be discussed in more detail below, the compact leg 26 provides feedback and directs a portion of the output beam back into the annular gain volume 24 for further amplification. The resonator 20 also includes a beam compactor system 28. The beam compactor system 28 includes a waxicon inner cone (WIC), a waxicon outer cone (WOC), a reflaxicon inner cone (RIC), and a reflaxicon outer cone (ROC). The beam compactor system 28 is used to expand and compact the light beams to and from the annular gain volume 24. The compacted beam is directed to and reflected from a large turning flat mirror BSM8. The light reflected from the large turning flat mirror BSM8 is directed to a scraper mirror BSM9 with a decentered aperture 30. All of the light beam directed to BSM9 but the portion which is incident on the decentered aperture 30 is reflected from BSM9 forming an output beam. The scraper hole 30 allows a portion of the light beam reflected from the large turning flat mirror BSM8 to pass through BSM9 to the compact leg 26.

In operation, as best shown in FIG. 2, a portion of the light beam reflected from the large turning flat mirror BSM8 is directed through the decentered aperture 30 in the scraper mirror BSM9 as a light beam 32 and from there to the feedback beam path. The balance of the light beam from the large turning flat BSM8 forms an output light beam 34. The light beam 32, directed through the decentered aperture 30 in the scraper mirror BSM9, is reflected from the flat steering mirror BSM1 as a light beam 36. The light beam 36 is directed toward the flat beam steering mirror BSM2 and reflected therefrom as a light beam 38. The light beam 38 is reflected from the flat beam steering mirror BSM3 as a light beam 40, which, in turn, is reflected from another flat beam steering mirror BSM11 as a light beam 42. The light beam 42 is directed to the flat beam steering mirror BSM4, which is optically aligned with the waxicon inner cone (WIC). The light beam 42, reflected from the flat beam steering mirror BSM4, is then reflected to the waxicon inner cone (WIC) as the light beam 44. The waxicon inner cone (WIC) transforms the light beam 44 into a radially expanding beam 46 and directs it to the waxicon outer cone (WOC), which forms an annular light beam which is reflected as a light beam 48 to the rear cone mirror BSM6, making a first pass through the annular gain volume 24. The rear cone mirror BSM6 causes the annular beam to be reflected back as a light beam 50 making a second pass through the annular gain volume 24. The annular light beam 50 is directed to the reflaxicon outer cone (ROC), which compacts the annular light beam 50, and directs it to the reflaxicon inner cone (RIC), where it is compacted as light beam 52. The compacted light beam 52 is reflected from the reflaxicon inner cone (RIC) as a compacted light beam 54 which, in turn, is directed and reflected from the large turning flat mirror BSM8. As mentioned above, a portion of the light beam reflected from the large turning flat mirror BSM8 is directed through the centered aperture 30 in the scraper mirror BSM9 forming a feedback loop while the remaining portion is outcoupled from the resonator forming an output beam 34.

In order to optimize the phase quality of the output beam 34, the various optical surfaces within the resonator 20 must be optically aligned. As will be discussed in more detail below, the alignment system in accordance with the present invention is adapted to provide a relatively simple and systematic method for aligning the various optical surfaces within the resonator 20.

The four mirrored surfaces of the beam compactor mirror system 28 (WIC, WOC, ROC and RIC) are known to be manufactured on a large optics diamond turning machine as two sets of mirror surfaces (WIC-RIC and WOC-ROC). These two sets of mirror surfaces are permanently aligned and mounted together so that the beam compactor mirror system 28 can be considered as a rigid unit. Therefore, the alignment of HEXDARR can be reduced to two remaining key elements: compact leg 26 beam relative to the beam compactor 28 and rear cone BSM6 relative to the beam compactor 28. The beam position and direction at the end of the compact leg (at WIC) are determined by the last two mirrors, BSM11 and BSM4, while the alignment of the rear cone BSM6 is controlled by the mechanical mounts (not shown) on the rear cone assembly. The compact leg beam decentration has a negligible effect on the resonator mode since it simply re-defines the boundary of the beam at WIC. The tolerance for the rear cone tilt is also very high (up to a couple of degrees) because it works as a retro-reflective element. As a result, only two misalignment modes are of concern: compact leg tilt and rear cone decentration. It is desireable, then, to determine these two quantities for a given resonator setting.

A probe beam of good beam quality can be injected into the compact leg 26 through the feedback hole 30. The beam tilt at WIC should be controlled to less than 20 to 30 micro-radians to have a minimal impact on the laser performance. This value comes largely from the compact leg tilt because the probe laser (not shown) generally can be aligned to within an accuracy of less than 10 micro-radians. The probe beam travels through the compact leg 26, beam compactor 28, annular leg 56, and is finally outcoupled by the scraper BSM9. A good-quality wave front sensor 58 is then used to measure the output near-field phase. Since each misalignment mode has its own characteristic effect on the output phase, it is possible to deduce the misalignment status based on the distinctive features appearing in the phase profile.

In general, compact let tilt will induce a significant output phase tilt (FIG. 3b) and rear cone decentration will result in an obvious phase shearing (FIG. 3c) as compared to the aligned case illustrated in FIG. 3a. While there may be some other phenomena which can be used to assess the misalignment status, only the near-field phase tilt information can be used to obtain a quantitative assessment directly and most effectively. It is sensitive to misalignments. It varies linearly with the misalignment. It is directional and easy to quantify. Finally, tilts induced by different misalignment modes can be superimposed with each other. These attributes provide a powerful tool for monitoring the resonator misalignment.

In general, the output phase can be expressed as a combination of phase tilt, induced by compact leg tilt, and phase shearing, induced by rear cone decentration, as shown in equation (1).

$$\phi = (t_x x + t_y y)/M + a(d_x \cos\theta + d_y \sin\theta) \qquad (1)$$

The quantities, $t_x$ and $t_y$, are compacted leg tilts in the x and y directions, and M is the resonator magnification. Variables, $d_x$ and $d_y$, are rear cone decentrations in the x and y directions, and a is a proportional constant relating the phase shearing to the magnitude of rear cone decentration. This value is dependent on specific HEXDARR configuration, which can be derived analytically or obtained from cylindrical resonator optical quality code (CROQ) calculations. For the current ALPHA chemical laser resonator, the value is approximately equal to 0.0023765. It is interesting to note that the phase shearing also has a phase tilt component. However, the magnitude of the tilt in the phase shearing depends on the area of evaluation, while the tilt induced by compact leg tilt is independent of the area as shown in FIG. 4.

For example, if beam tilts are derived from the output phase profile based on full beam radius, R, both $T_x$ and $T_y$ have the contributions from both compact let tilt-induced tilt and rear cone decentration-induced shearing. Now, if the phase tilts are re-evaluated again within a smaller circle with radius R', the contribution from compact let tilt-induced tilt remains the same while the contribution to the tilt from the rear cone decentration-induced shearing is enhanced by a factor of R/R'. In FIG. 4, the tilts are re-evaluated over a half circle. The shearing-contributed tilt is thus increased by a factor of two. This difference allows the calculation of the tilt associated with each misalignment mode as shown on the right-hand side in FIG. 4. The tilt associated with rear cone decentration is related to the shearing magnitude, which in turn is related directly to the magnitude of rear cone decentration. Therefore, by evaluating phase tilt twice, one within a smaller area, it is possible to determine the magnitudes, as well as directions, of both compact let tilt and rear cone decentration. Once these misalignments are determined, then the optical surfaces can be repositioned into better alignment.

The effectiveness of this alignment monitoring procedure was tested by the CROQ code. The output phase profile of a probe beam through the resonator was obtained with certain misalignment conditions. Without knowing the misalignment conditions, the full-circle and half-circle tilts were derived from the phase profile and used to determine the misalignment condition. The results are shown in Table 1 below.

TABLE 1

|  | CLT (Magnitude) micro-radians | CLT (Direction) Degrees | RCD (Magnitude) microns | RCD (Direction) Degrees |
| --- | --- | --- | --- | --- |
| Case 1 (Setup) | 75 | 115 | 350 | 150 |
| Case 1 (Prediction) | 90 | 104 | 365 | 150 |
| Case 2 (Setup) | 120 | 25 | 220 | −60 |
| Case 2 (Prediction) | 110 | 24 | 218 | −60 |
| Case 3 (Setup) | 120 | 25 | 0 |  |
| Case 3 (Prediction) | 122 | 25 | 7 |  |
| Case 4 (Setup) | 0 |  | 220 | −60 |
| Case 4 (Prediction) | 13 |  | 228 | −60 |

Table 1 shows four cases including mixed alignment conditions. The prediction of misalignment direction was generally very accurate. The magnitude of compact let tilt was off by at most 15 micro-radians. The magnitude of rear cone decentration is off at most 15 microns. These discrepancies are well within the misalignment tolerance (~30 micro-radians for compact leg tilt and ~100 microns for rear cone decentration). Therefore, there is no need to apply iterative processes to get a more accurate assessment. The misalignment status can be corrected using these values.

I claim as my invention:

1. A method for aligning the optical surfaces of a cylindrical optical resonator having a rear cone and a compact leg which includes a scraper mirror with an aperture, the method comprising:

directing a test beam into said aperture of said scraper mirror; and aligning the optical surfaces as a function of the amount of phase tilt and phase shearing exhibited by said test beam upon exiting from said aperture.

2. The method according to claim 1 comprising determining the amount of phase tilt and phase shearing by utilizing the amount of compact leg tilt and rear cone decentration.

3. The method according to claim 2 comprising measuring the amount of compact leg tilt at a sensor aligned with said exiting test beam to obtain said phase tilt.

4. The method according to claim 2 comprising measuring the amount of rear cone decentration at a sensor aligned with said exiting test beam to obtain said phase shearing.

5. The method according to claim 2 comprising determining the amount of phase tilt and phase shearing according to $\phi = (t_x x + t_y y)/M + a(d_x \cos\theta + d_y \sin\theta)$.

6. The method according to claim 1 comprising providing a visual indication of the phase tilt and phase shearing.

* * * * *